United States Patent
Lai et al.

(10) Patent No.: US 6,600,737 B1
(45) Date of Patent: Jul. 29, 2003

(54) BANDWIDTH PROTECTION FOR VOICE OVER IP

(75) Inventors: Poh Yoke Lai, Singapore (SG); Wee Sin Tam, Singapore (SG); Shafir Ahmad Hj Mastan, Singapore (SG); Steven Edelson, Wayland, MA (US)

(73) Assignee: Mediaring Ltd., Singapore Post Centre (SG)

(*) Notice: Subject to any disclaimer, the term of this patent is extended or adjusted under 35 U.S.C. 154(b) by 0 days.

(21) Appl. No.: 09/383,337

(22) Filed: Aug. 25, 1999

Related U.S. Application Data (60) Provisional application No. 60/119,778, filed on Feb. 11, 1999.

(51) Int. Cl.$^7$ ............................................... H04L 12/26
(52) U.S. Cl. ...................................... 370/352; 709/224
(58) Field of Search ................................ 370/352, 353, 370/354, 355, 356, 400, 466, 465, 468, 401, 404, 405, 410, 230, 235; 709/225, 226, 224, 204, 227, 249

(56) References Cited

U.S. PATENT DOCUMENTS

| | | | |
|---|---|---|---|
| 4,866,704 A | 9/1989 | Bergman | 370/85.4 |
| 5,452,289 A | 9/1995 | Sharma et al. | 370/32.1 |
| 5,471,470 A | 11/1995 | Sharma et al. | 370/81 |
| 5,600,649 A | 2/1997 | Sharma et al. | 370/435 |
| 5,764,627 A | 6/1998 | Sharma et al. | 370/271 |
| 5,812,534 A | 9/1998 | Davis et al. | 370/260 |
| 5,918,020 A | 6/1999 | Blackard et al. | 395/200.58 |
| 5,940,479 A | 8/1999 | Guy et al. | 379/93.01 |
| 6,038,601 A | * 3/2000 | Lambert | 709/226 |
| 6,223,221 B1 | * 4/2001 | Kunz | 709/224 |
| 6,298,041 B1 | * 10/2001 | Packer | 370/231 |
| 6,337,858 B1 | * 1/2002 | Petty | 370/356 |
| 6,473,793 B1 | * 10/2002 | Dillon | 709/223 |

OTHER PUBLICATIONS

K. Nahrstedt, J. Smith, "The QOS Broker", IEEE Multimedia, Spring 1995, pp. 53–67.

B. Dempsey, Y. Zhang, "Destination Buffering for Low–Bandwidth Audio Transmissions Using Redundancy–Based Error Control", 21$^{st}$ IEEE Conference on Local Computer Networks, Oct. 1996, pp. 345–354.

N. Muller, "Multimedia Over the Network", Byte, Mar. 1996, pp. 73–74, 76–78, 80, 82.

(List continued on next page.)

*Primary Examiner*—Douglas Olms
*Assistant Examiner*—Ricardo M. Pizarro
(74) *Attorney, Agent, or Firm*—Fenwick & West LLP (57) ABSTRACT

A system and method for managing the transfer of data from a server to a client over an integrated voice and data network limits the bandwidth used for sending non-voice data, such as advertising data, from a server to the client. The limit on the transmission of non-voice data ensures that enough bandwidth is available for the transmission of voice data. The system and method comprise at least one server and at least one client which are communicatively coupled over an integrated voice and data network. A transfer data rate input is sent by a client to a server. The server determines the transfer data rate for non-voice data based on the transfer data rate input. The server then sends the data, preferably non-voice data, to the client at the transfer data rate. The present invention may also comprise an intercept layer and a bandwidth management control module. The intercept layer receives the data from the server, and the bandwidth management control module, which is communicatively coupled to the intercept layer and a voice application, examines the data packets and manages the sending of an acknowledge packet to the server indicating that the data has been received. The bandwidth management control module may delay the sending of the acknowledge packet to decrease the transfer of data from the server to the client. Additionally, the bandwidth management control module may change the window size of the acknowledge packet to indicate to the server to limit the size of the data sent to the window size.

12 Claims, 6 Drawing Sheets

Client Server Interaction

OTHER PUBLICATIONS

N. Jayant, "High Quality Networking of Audio–Visual Information", IEEE Communications Magazine, Sep. 1993, pp. 84–95.

B. Dempsey, J. Liebeherr, A. Weaver, "On Retransmission–based Error Control for Continuous Media Traffic in Packet–Switching Networks", Computer Networks and ISDN Systems 28 (1996), pp. 719–736.

R. Lau, G. Flammia, C. Pao, V. Zue, "WebGalaxy: Beyond Point and Click—a Conversational Interface to a Browser", Computer Networks and ISDN Systems 29, 1997, pp. 1385–1393.

F. Kaladji, Y. Ishibashi, S. Tasaka, "Performance Evaluation of a Dynamic Resolution Control Scheme for Video Traffic in Media–Synchronized Multimedia Communications", IEICE Trans. Commun., vol. E81–B No. 3, Mar. 1998, pp. 565–574.

R. Chen, L. Chen, M. Chen, T. Tsai, "An I–Phone System Design and Implementation With a Portable Speech Coding Coprocessor", IEEE Transaction on Consumer Electronics, vol. 43, No. 4, Nov. 1997, pp. 1262–1269.

P. Tien, Maria Yuang, "Intelligent Voice Smoother for Silence–Suppressed Voice Over Internet", IEEE Journal on Selected Areas in Communications, vol. 17, No. 1, Jan. 1999, pp. 29–41.

V. Hardman, M. Sasse, I. Kouvelas, "Successful Multiparty Audio Communication Over the Internet", Communications of the ACM, May 1998, vol. 41, No. 5, pp. 74–80.

* cited by examiner

On-screen Telephone Image With Advertising Area

```
1   # Server Perl Script
2   #----------------------------------------
3   $ |=1 ;
4   &MyReadParse ;
5   $MY_FILE = "d: /inetpub/scripts/advert/" . $in{image} ;
6
7   # Open Files, send header info and setup to read and send data
8           open ( MY_FILE, "<$MY_FILE" )
9   or die ( "HTTP/1.0 200 OK\nContent-Type: text/plain\n\nFile not found\n" );
10
11  print "HTTP/1.0 200 OK\n" ;
12  print "Content-Type: image/gif\n" ;
13  print "Content-Length: " . (-s $MY_FILE) . "\n\n" ;
14
15  binmode ( MY_FILE) ;
16  binmode (STDOUT) ;
17
18  # Select a rate in Bytes per second.
19  # If one is input, use it, otherwise default to 256 bytes per sec.
20  if ($in{rate} == -1)
21          # No Rate Control, set VERY large number
22          {   $Rate = 9999999 ; }
23  elsif ($in{rate} > 0)
24                  #   We have an explicite rate (bytes per sec.) use it.
25                  {$Rate = $in{rate} ; }
26          else
27                  # No explicite rate.  Send at 256 bytes per sec.
28                  { $Rate = 256 ; }
29
30
31  # Read a buffer of size $Rate and then send it out, then wait a second
32  # Repeat until no data left in file.
33
34  while ( $cb = read ( MY_FILE , $data , $Rate ) )
35      { print $data;
36         sleep(1) ;
37      }
38
39  # Close and Exit
40  close (MY_FILE) ;
41  exit ;
#----------------------------------------
```

```
# - - - - - - - - - - Client side rate management pseudocode - - - - - - - -

# First request the HTTP advertising data
1    SendHttpRequest ( )
2    # Allow 10 seconds to fill the incoming buffer.
3    # A full buffer will cause the system to send
4    # interact with the server to stop data flowing in.
5    Wait (10s)
6
7    # Now empty the buffer at a slow rate.
8    # (system interaction with the server will refill it
9    # at approx. this rate so we'll have a slow datastream)
10   while (data available)
11         { Read (256 bytes)
12           Wait (1 sec)
13         }
# - - - - - - - - - - - - - - - - - - - - - - - - - - - - - - - - - - - - - - -
```

BANDWIDTH PROTECTION FOR VOICE OVER IP

This application claims the benefit of a Provisional Application No. 60/119,778, filed Feb. 11, 1999.

BACKGROUND

1. Field of Invention

The present invention relates generally to an integrated voice and data network, and more particularly, to a method and apparatus for regulating the transmission of data between a server and a client via an integrated voice and data network.

2. Background of the Invention

The typical internet connection has limited bandwidth. For example, a current dial-up modem has an upper limit of approximately 56 kilo-bits per second. Higher speed connections are available but all have their limits.

A typical internet connection allows multiple functions to operate simultaneously. For example, when a user is logged onto the internet, the user may be simultaneously "surfing" the web, downloading software, and accessing mail. Each of these functions share the available bandwidth connection in an unspecified way. Generally, for functions which are not time sensitive, the method for sharing the bandwidth connection is not important. However, some functions running on the internet are time sensitive and run in "real-time". That is, a temporary slow down or interruption in the flow of the data stream may cause severe consequences. When one or more streams of the application is real-time, then a more intelligent sharing mechanism is required.

Voice communication is an example of an internet function which is time sensitive and runs in real time. If a voice application sending a voice communication does not receive an adequate portion of the available bandwidth on an ongoing basis, the sound received may have delays, gaps, and other artifacts that decrease the quality of the sound. In extreme cases, such delays and artifacts may even render the voice application unusable.

SUMMARY OF THE INVENTION

The limitations in the prior art are overcome by a system and method for managing the transfer of data from a server to a client over an integrated voice and data network. In one aspect of the invention, the present invention advantageously limits the bandwidth used for sending non-voice data, such as advertising data, from a server to the client. The limit on the transmission of non-voice data advantageously ensures that enough bandwidth is available for the transmission of voice data. One advantage of the present invention is that it improves the quality of voice applications by managing and controlling the bandwidth used to transfer non-voice data.

In one embodiment of the present invention, a transfer data rate input is sent by a client to a server. The server determines the transfer data rate for non-voice data based on the transfer data rate input. The server then sends the data, preferably non-voice data, to the client at the transfer data rate. If the client does not send a transfer data rate input to the server, then a default data transfer rate is used. Preferably, the client may dynamically change the transfer data rate by sending a different transfer data rate input to the server. One advantage of this embodiment is that it allows the client to manage the bandwidth allocated to non-voice data based on the bandwidth requirements of a voice application.

In another embodiment, the present invention comprises an intercept layer and a bandwidth management control module. The intercept layer receives the data from the server. The bandwidth management control module, which is communicatively coupled to the intercept layer and a voice application, examines the data packets and manages the sending of an acknowledge packet to the server indicating that the data has been received. Preferably, the bandwidth management control module may delay the sending of the acknowledge packet to decrease the transfer of data from the server to the client. In another embodiment, the bandwidth management control module may change the window size of the acknowledge packet to indicate to the server to limit the size of the data sent to the window size. Additionally, the bandwidth management control module may receive a signal from a voice application indicating that either more or less bandwidth is available for non-voice data.

DETAILED DESCRIPTION OF PREFERRED EMBODIMENTS

Figure 1:
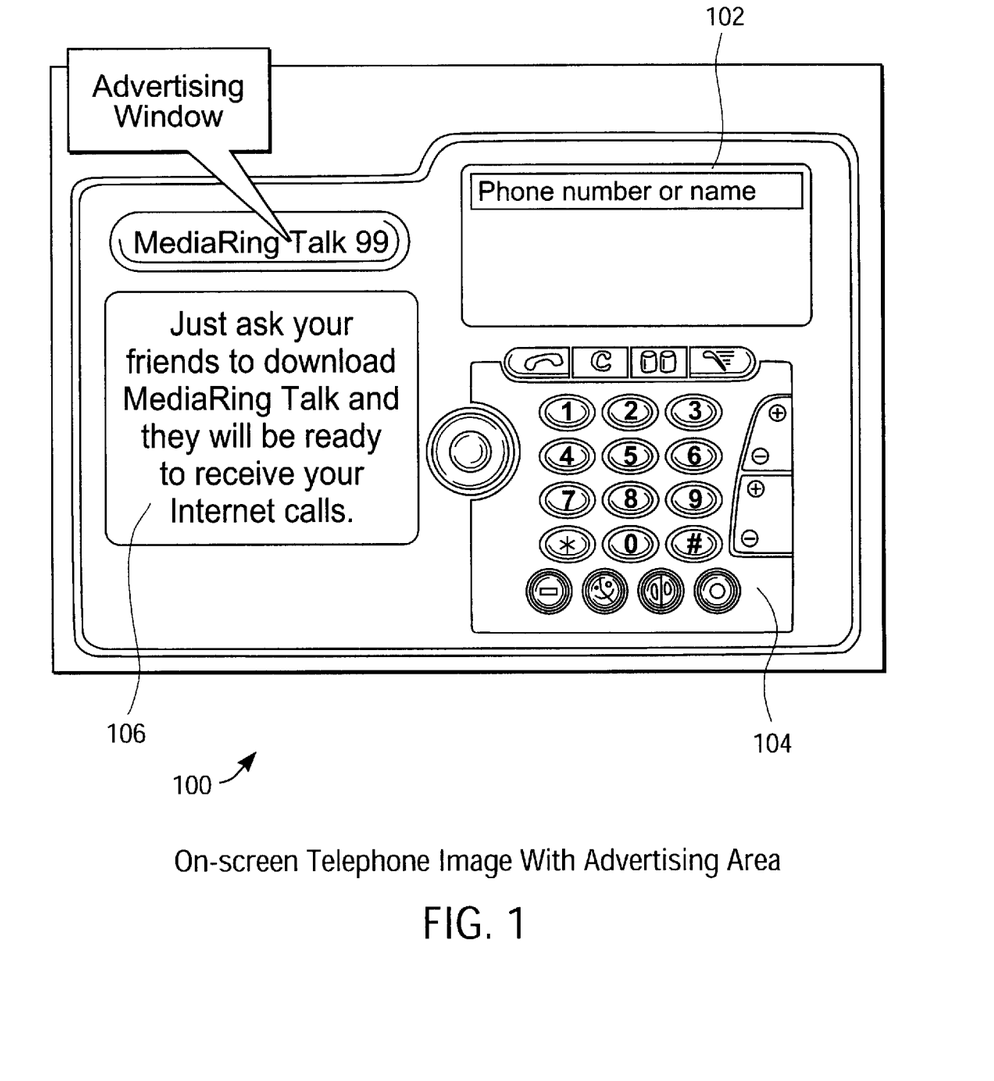
FIG. 1 is an illustration of a user interface for an on-screen internet telephony device with an advertising area in accordance with the present invention.

Referring to FIG. 1, there is shown an illustration of a user interface 100 of an onscreen internet telephony device with an advertising area in accordance with the present invention. The internet telephony device is preferably MediaRing Talk by MediaCom Technologies in Singapore. The internet telephony device executes on a client or user computer and is coupled over a network, preferably an integrated voice and data network, to a server or a computer system or a network. The user interface 100 comprises three, simultaneously displayed areas: a first area 102, for displaying information such as the phone number or name of the recipient caller and the duration of the call; a second area 104, for displaying the control buttons for operating the internet telephony device, and a third area 106, here labeled "Advertising Window", for displaying advertisements, messages or Web pages to the user of the internet telephony device. The organization and placement of the areas in the user interface 100 of FIG. 1 is merely illustrative and not limited by the present invention, and variations in the placement, size, and shape of the areas would be readily apparent to those of skill in the art of user interface design. Thus, the internet telephony device uses both voice data and non-voice data, such as advertising without decreasing the quality of the voice application.

Figure 2:
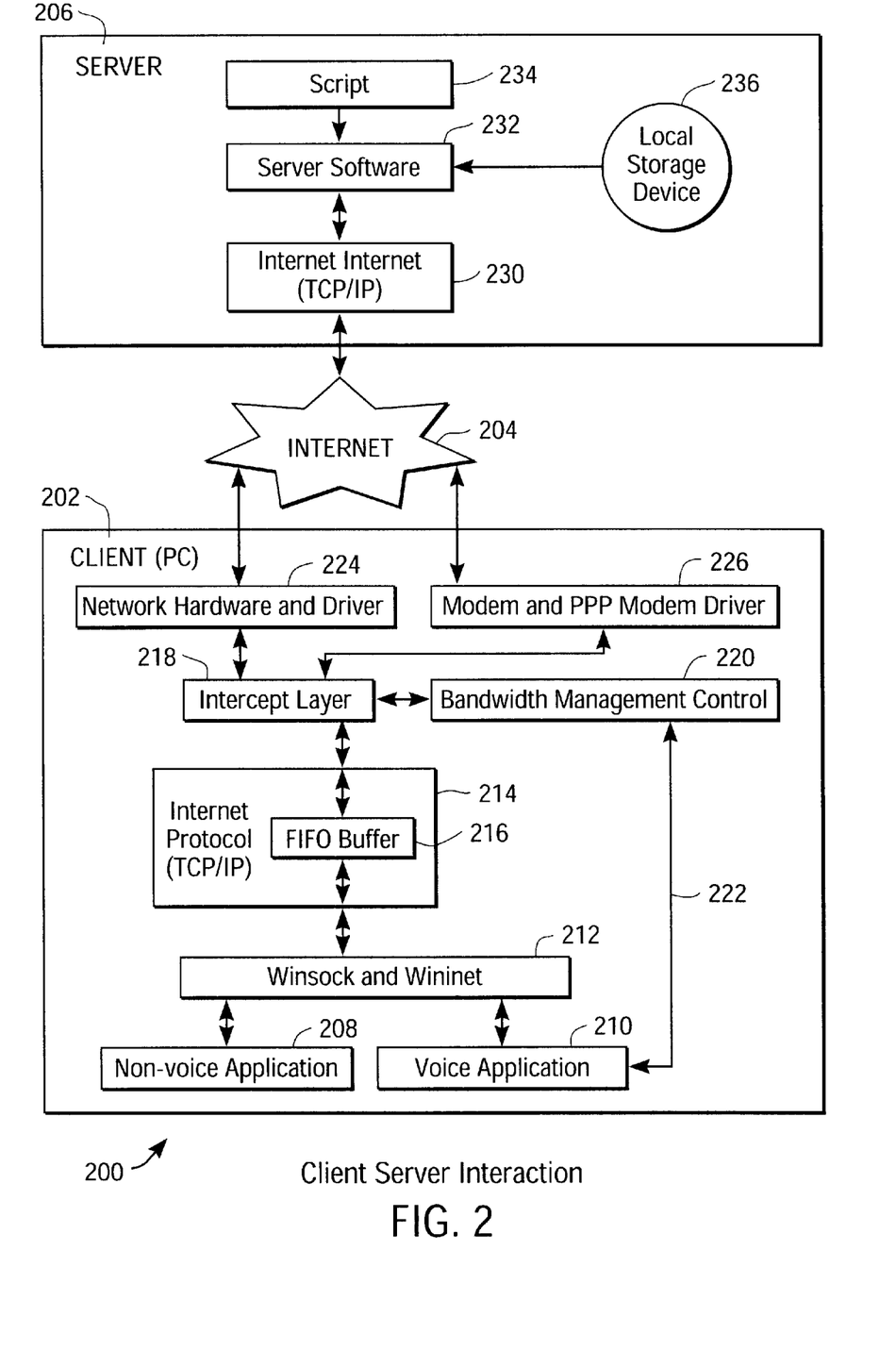
FIG. 2 is a block diagram of an integrated voice and data network system and the associated software architecture in accordance with the present invention.

Referring now to FIG. 2, there is shown a block diagram of an integrated voice and data network system 200 and the associated software architecture in accordance with the present invention. In accordance with such system 200, there is provided at least one client computer 202 communicatively coupled by a network 204, such as the internet, to one or more computer servers 206. The client computer 202 may be used for executing non-voice applications 208, such as web pages, advertisements, software programs, and voice applications 210, such as MediaCom Technologies' internet telephony device, MediaRing Talk. The client computer 202 further comprises a WinSock/Wininet component 212, a TCP/IP subsystem 214, an intercept layer 218, and a bandwidth management control module 220. The client computer 202 also includes either a network hardware and driver module 224 or a modem and PPP Modem driver 226 or both. The TCP/IP subsystem 214 comprises a receiving buffer 216 which is preferably a first in first out (FIFO) buffer. The receiving buffer 216 buffers incoming and outgoing data and de-couples a voice application 210 from the flow of data received over the internet 204. The operation of receiving buffer 216 is described below in more detail with reference to FIGS. 5 and 6. The network hardware and driver module 224 provides an Ethernet connection to server 206. The modem and PPP driver 226 provides a telephone connection to serve 206. In a preferred embodiment the client computer 202 may be implemented on an Intel-based computer operating under Microsoft Windows 3.1, Windows95, or WindowsNT operating system, or a SPARC-based computer operating under UNIX, or any other equivalent devices.

In accordance with the present invention, the client computer 202 executes a voice application 210, such as an internet telephony device, in memory. The voice application 210 is comprised of a number of executable code portions and data files. These include code for creating and supporting the user interface. The voice application 210 may be provided to the client computer 202 on a computer readable media, such as a CD-ROM, diskette, 8 mm tape, or by electronic communication over the network 204 from one of the servers 206 or other distributors of software, for installation and execution thereon. The internet 204 may be any type of network which delivers data to destinations.

The server 206 comprises a TCP/IP subsystem 230, a server software 232, a server script 234, and a local storage device 236 for storing data files. The TCP/IP subsystem 230 receives and sends data, also called packets, according to the TCP/IP protocol. The server software 232 is an application program which is executed on the server 206. The server software 232 is communicatively coupled to the TCP/IP subsystem 230 to receive requests or data packets over the internet 204 and responds by sending the requested data, such as a web page, to the requesting client 202.

A request for data, such as a web page, starts within client 202 with a voice application 210 or non-voice application 208. The application, whether it is a browser like Netscape's Netscape Navigator or a voice-application 210, like MediaRing's MediaTalk, sends a request to the server uniform resource locator (URL). This request, which comprises a data packet, is sent via the Winsock/Winlnet module 212, and the TCP/IP subsystem 214, where the request is formatted in conventional manner. The request is then sent to the network hardware and driver module 224 if the connection to server 206 is an Ethernet connection, or to the Modem and PPP Driver 226, if the connection to server 206 is a telephone connection.

The data or data packet is then sent to server 206 via the internet 204 in conventional manner. The data packet is received by the server 206 and forwarded to the server software 232. The server software 232 is an application program which executes on the server computer 206. Preferably, the server software 232 executes a web-page script 234 which, among other things, directs the server software 232 how to retrieve data from the local storage device 236 and send the data to client 202.

Figure 3:
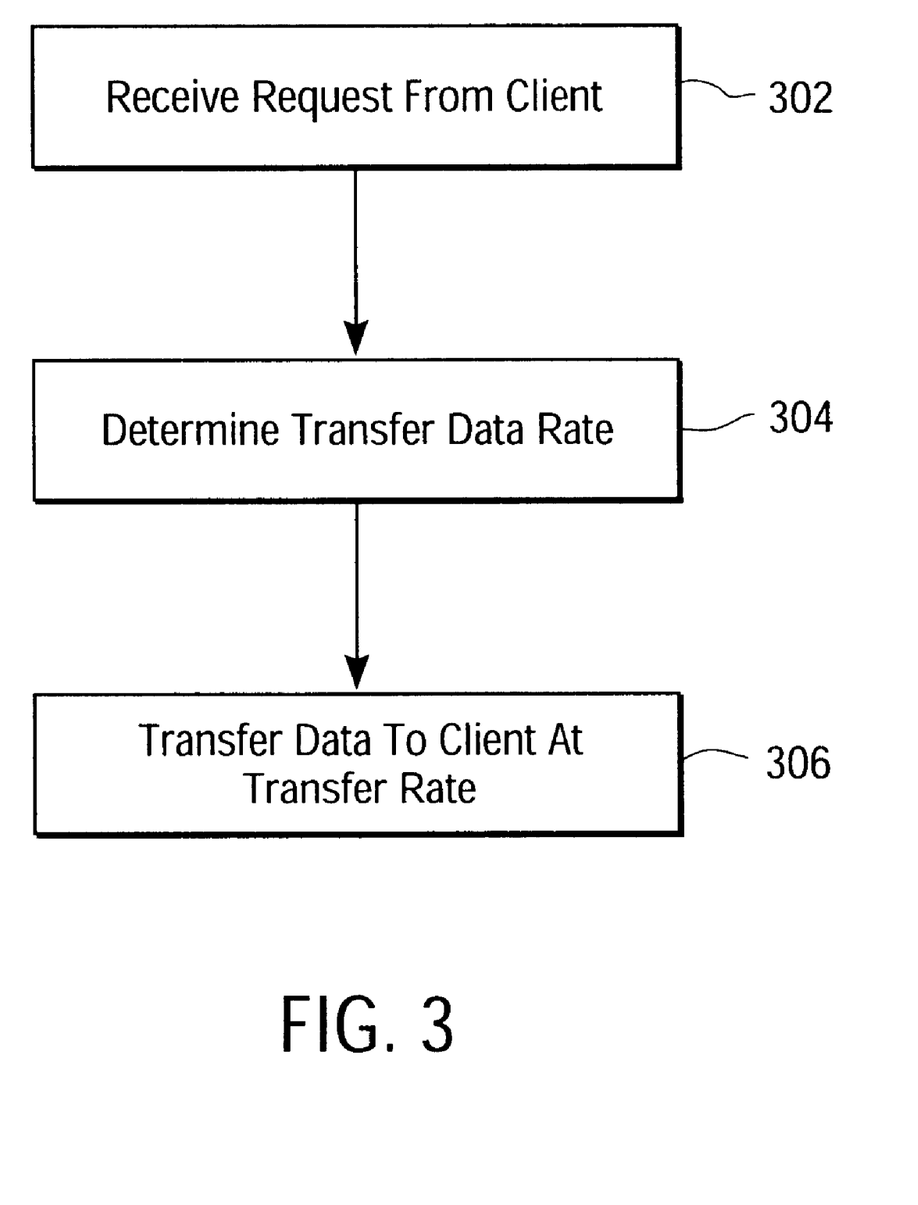
FIG. 3 is a flow chart of a preferred embodiment of a method for transferring data from a server to a client in accordance with the present invention.

Referring now to FIG. 3, there is shown a flow chart of a preferred embodiment of a method for transferring data from a server to a client. The client 202 sends (302) a request for data to server 206. Generally, in accordance with the present invention, the request received by the server 206 will be for non-voice data such as non-voice data for a non-voice application 208 like a web page, or non-voice data for a voice application 210 such as advertisement data for an internet telephony device as described in reference to FIG. 1. In response to the request for data from client 202, the server 206 performs conventional internet server activity such as opening a file in local data storage 236, establishing a write mode, and sending header information to client 202. These conventional internet server activities are familiar to those skilled in the art. In accordance with the present invention, the server 206 then determines (304) a transfer data rate for transferring the data. Preferably, this is accomplished by the client 202 sending a transfer data rate input to the server 206. Based on the transfer data rate input from the client 202, the server 206 determines the transfer data rate. If no transfer data rate input is sent by the client 202, then the server 206 uses a default transfer data rate to send the requested data over the internet 204. After the transfer data rate is determined, the server 206 sends the data to the client using the established transfer data rate.

While the server 206 is sending the requested data to the client 202, the client 202 may send another transfer data rate input to the server 206 indicating that the server 206 should either increase or decrease the transfer data rate. For example, if the client 202 detects that a high speed connection has more bandwidth than is needed for the voice data, then the client 202 can increase the bandwidth allocated for sending the non-voice data by sending a higher transfer data rate input to the server 206 to increase the transfer data rate. Similarly, if the client 202 detects that more bandwidth is needed for voice data, for example to maintain or improve voice quality, then the client can decrease the bandwidth allocated to the non-voice data by sending a lower transfer data rate input to the server 206. Thus, the present invention allows the client 202 to dynamically update the transfer data rate used to send non-voice data from the server 206 to the client 202. In other words, the present invention manages the bandwidth allocated to non-voice data to ensure that an appropriate amount of bandwidth is available for voice data for voice application 210.

Figure 4:
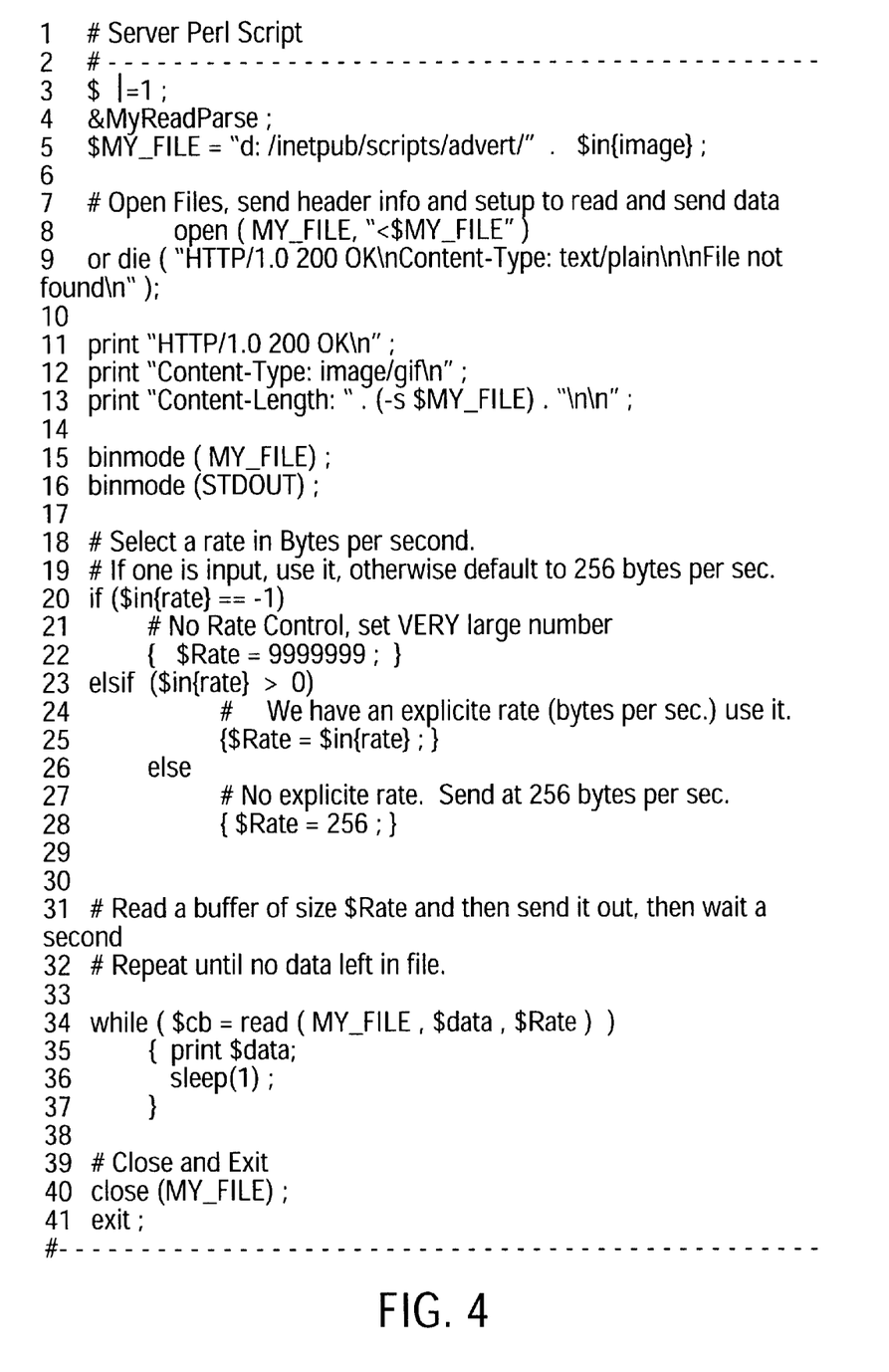
FIG. 4 is an example of a script for implementing a preferred embodiment of the present invention.

Referring now to FIG. 4, there is shown a script for implementing a preferred embodiment of the present invention as described with reference to FIG. 3. The script in FIG. 4 is written in Perl, but one skilled in the art will realize that other script mechanisms may be used to implement the present invention, such as mod_perl, FastCGI, Active server Pages, or an Applet on the server 206.

In response to a request for data from client 202, the present invention opens a file in data files (i.e. local storage device) 236, establishes a write mode, and sends header information to client 202. These steps are conventional internet server activity and are familiar to those skilled in the art. A transfer data rate for the transmission of the data from server 206 to client 202 is then determined. Preferably, the transfer data rate is in bytes per second. If the server 206 receives an input from the client 202 indicating that no limitation on data flow is necessary, then the flow of data from server 206 is not limited. For example, as shown in the script example in FIG. 4, if a value of −1 is received as an input, then a very large value for the transfer data rate is used essentially indicating no limit on the transfer data rate for non-voice data. Otherwise, if the server receives an input indicating that the data flow from the server 206 should be limited, then the data flow from the server is limited to the transfer data rate received by the server 206. For example, as shown in the script example in FIG. 4, if a non-zero positive value is received as the transfer data rate input from the client 202, this input value is the desired rate of the data transmission. Additionally, if no transfer data rate is inputted to server script 234, then a default transfer data rate is used for sending data from the server 206 to the client 202. For example, in the script example in FIG. 4, the default transfer data rate is set to 256 bytes per second. A default rate is chosen to ensure that the transmission of data from server 206 does not interfere with the transmission of voice data. As one skilled in the art will realize, the default transfer data rate may also be set to another number. For example, if the client 202 uses a modem with a high bandwidth connection, then a default rate of 256 bytes per second may be too conservative, and a faster default rate may be established according to the principles of the present invention. Thus, the present invention may establish a different default rate for a modem with a higher bandwidth connection.

Once the transfer data rate has been established, the present invention then transmits the data over the internet 204 according to the transfer data rate. For example, as shown in the script example in FIG. 4, the data is read from the local storage device 236 into a buffer (not shown) at the established transfer data rate. This data is then sent to the internet 204 and to the client 202. Preferably, the script of the present invention includes a brief waiting period, such as 1 second, before retrieving and sending out additional data. Thus, the present invention advantageously limits the bandwidth used for sending non-voice data, such as advertising data, from server 206 to client 202 over the internet 204. The limit on the transmission of non-voice data advantageously ensures that enough bandwidth is available for the transmission of voice data. Thus, the present invention provides a system and method for improving the quality of voice applications by preserving or protecting the bandwidth used to deliver non-voice data.

One skilled in the art will realize that many variations of the above-described system and method are possible. For example, a custom web-server could be used to manage the flow of data from the server 206 to the client 202. Alternatively, a router or a proxy server could be coupled to the server 206 and the internet 204 and manage the flow of data from the server 206 to the client 202. One advantage with this embodiment is that no special software needs to be installed on the server 206, and thus, any currently existing and operating server could be used.

Figure 5:
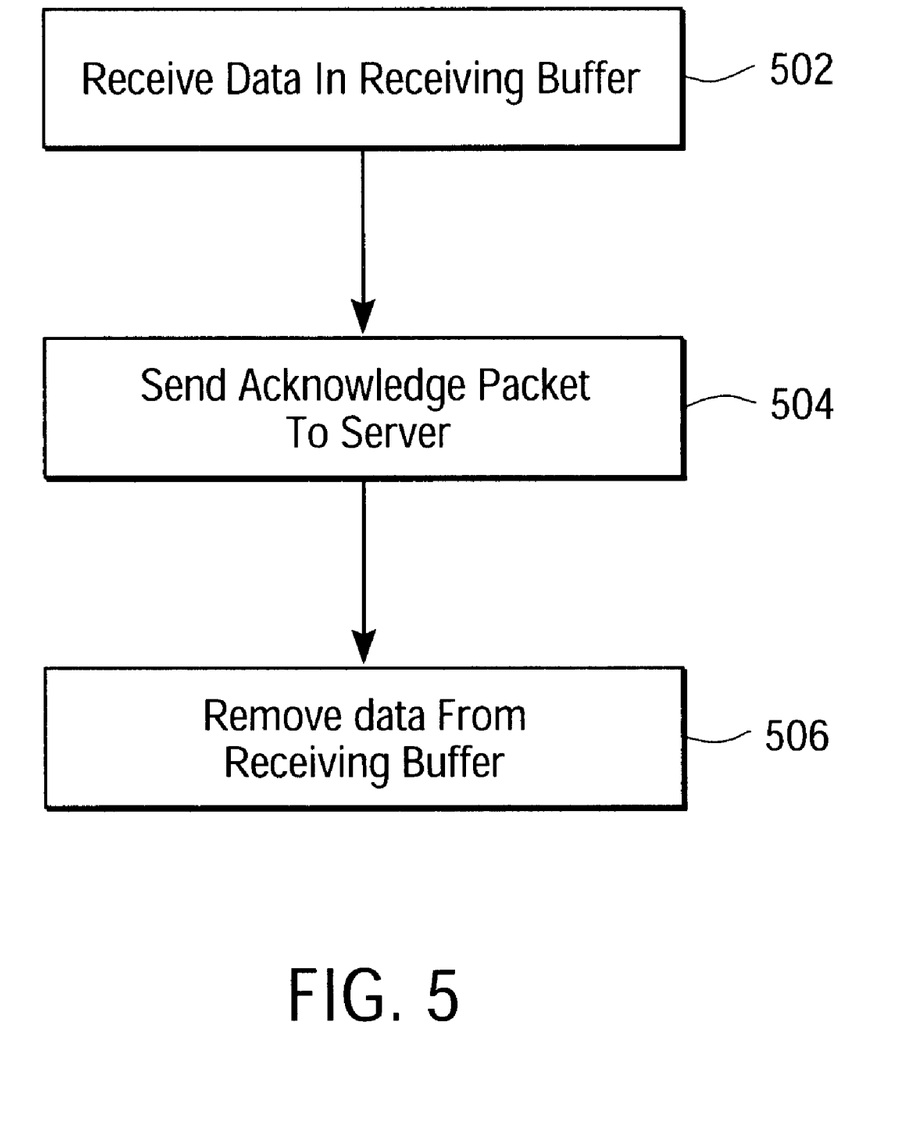
FIG. 5 is a flow chart of another embodiment of a method for transferring data from a server to a client in accordance with the present invention.

Referring now to FIG. 5, there is shown a flow chart for another embodiment of a method for receiving data at a client from a server. In this embodiment, the client 202 receives the non-voice data from the server 206. Enough data is received by the client 202 in a receiving buffer 216 until the data in the receiving buffer 216 is full or otherwise reaches a predetermined level. When the receiving buffer 216 reaches the predetermined level, the client 202 sends a message or an acknowledge packet to server 206. Preferably, the acknowledge packet includes a "window size" indicating the amount of room available in the receiving buffer 216. When the server 206 receives the acknowledge packet, the server sends an amount of data equal to or less than the window size. In another embodiment, when the receiving buffer 216 reaches a predetermined level, the client 202 may send an acknowledge packet after a delay period to delay the sending of data from the server 206 to the client 202. The data is then removed from the receiving buffer 216 and sent to the appropriate application, 208 or 210.

Figure 6:
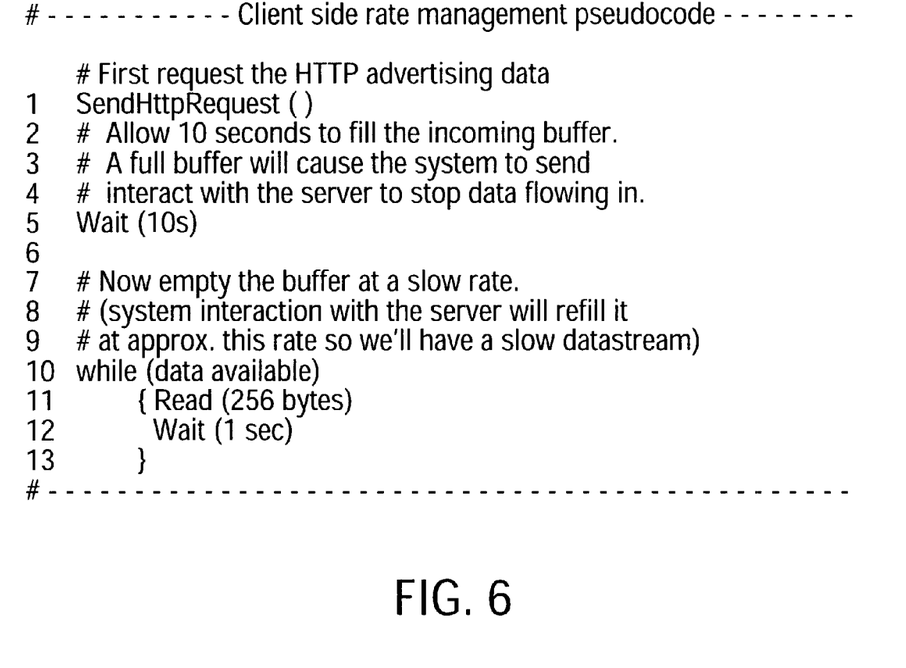
FIG. 6 is an example of a script for implementing another embodiment of the present invention.

Referring now to FIG. 6, there is shown a script for implementing the embodiment described with reference to FIG. 5. In this embodiment, the client 202 accepts data from the server 206 at a receiving data rate. As illustrated in the script in FIG. 6, the client 202 first sends a request for data to the server 206. When the receiving buffer 216 reaches a predetermined level, such as when receiving buffer 216 is full, client 202 sends a message or an acknowledge packet to server 206 indicating that the data has been received. The acknowledge packet preferably comprises a "window size" indicating the available space in the buffer 216.

The server 206 then sends data corresponding to the window size. The data in receiving buffer 216 is then emptied and sent to the associated application 208 or 210. Preferably, the receiving buffer 216 is emptied at a rate of 256 bytes per second. Alternatively, the receiving buffer 216 may be emptied at a faster or slower rate depending on the bandwidth available and the bandwidth requirements of the voice application 210.

Additionally, in a preferred embodiment, the client 202 includes an intercept layer 218 and a bandwidth management control module 220. The intercept layer 218 is coupled to receive data from the server 206 and transmits them to the receiving buffer 216. The intercept layer 218 may be implemented with commercial products such as the VPCOM SHIM by Ashley Laurent, Inc. of Austin, Tex. The bandwidth management control module 220 is coupled to the intercept layer 218 and examines the contents of the data packets being received by and sent by the client 202. The bandwidth management control module 220 may modify the contents and timing of the data being received or sent. The bandwidth management control module 220 can also modify or delete the data packets to change the stream of data being sent to or from the client 202. Additionally, the bandwidth management control module 220 can control the sending of an acknowledge packet to server 206. The bandwidth management module 220 is also communicatively coupled to the voice application 210 allowing the voice application 210 to send a signal to the bandwidth management control module 220 indicating the current bandwidth needs of the voice application 210. In other words, voice application 210 can send a signal to bandwidth management control module 220 indicating that either more or less bandwidth is needed for voice data for the voice application. The bandwidth management control module 220 responds by decreasing or increasing the window size of the acknowledge packet as needed or by increasing, decreasing, or eliminating the time delay for sending the acknowledge packet to the server 206. Voice application 210 can also indicate to bandwidth control module 220 the existence and speed of a voice connection.

Thus, one advantage of the present invention is that the flow of data from the server 206 to the client 202 can be controlled by the bandwidth management module 220 and the voice application 210. For example, if voice application 210 requires more bandwidth, voice application 210 can send a signal to bandwidth management module 220. Bandwidth management module can then delay sending an acknowledge packet to server 206. One skilled in the art will realize that the duration of time of the delay can be varied accordingly; however, the delay should not be greater than the amount of the server 206 waits before resending the data.

For example, bandwidth management module 220 can intercept an acknowledge packet sent by the TCP/IP subsystem 214, preferably at the intercept layer 218, and reduce the size of the window size being returned to the server 206. One advantage of reducing the window size in the acknowledge packet is that the server 206 will send less data, thus reducing the bandwidth used by the non-voice data.

Additionally, the voice application 210 can inform the bandwidth management control module 220 when the voice application 210 is active or not, and thus, when bandwidth for the voice application is or is not required. Furthermore, if the voice application has various voice bandwidth options, then it can inform the bandwidth management control module 220 of this need. Thus, based on the requests and requirements of the voice application 210 and the observed throughput of the connection to the server 206, the present invention can change the bandwidth allocated to non-voice data by adjusting the time delay for sending an acknowledge packet or by changing the window size of the acknowledge packet.

From the above description, it will be apparent that the invention disclosed herein provides a novel and advantageous system and method for managing the bandwidth for data transferred between a server and a client. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for regulating the transmission of packets received at a client from a server over an integrated voice and data network in connection with a voice application, the voice application having a voice bandwidth requirement, the system comprising:

a voice application for providing non-voice services over an integrated voice and data network;

an intercept layer at the client for receiving packets and for sending an acknowledge packet to the server; and a bandwidth management module coupled to the intercept layer, for managing the sending of the acknowledge packet to the server, the acknowledge packet comprising available buffer size information.

2. The system of claim 1 wherein the bandwidth management module sends a signal to the intercept layer to send the acknowledge packet after a delay period.

3. The system of claim 1 wherein the bandwidth management module receives the acknowledge packet from the intercept layer and sends the acknowledge packet back to the intercept layer after a delay period.

4. The system of claims 2 or 3 wherein the bandwidth management module determines an optimal time period for the delay period in response to the voice bandwidth requirement for the voice application.

5. The system of claim 1 wherein the bandwidth management module modifies the available buffer size information in the acknowledge packet in response to the voice bandwidth requirement for the voice application.

6. The system of claim 1 wherein the bandwidth management module decreases the available buffer size information in the acknowledge packet in response to the voice bandwidth requirement for the voice application.

7. A method for regulating the transmission of packets received at a client from a server through an integrated voice and data network in connection with a voice application, the voice application having a voice bandwidth requirement, the method comprising the steps of:

providing non-voice services over said integrated voice and data network, said services provided by a voice application;

receiving data from the server; and in response to receiving the data, sending an acknowledge packet comprising available buffer size information from the client to the server, the available buffer size information having been dynamically modified in response to the voice bandwidth requirement for the voice application.

8. The method of claim 7, wherein the acknowledge packet is sent to the server after a delay period.

9. A computer program product for regulating the transmission of non-voice packets sent from a server to a client over an integrated voice and data network in connection with a non-voice application running concurrently with a voice application on the client, the voice application having a voice bandwidth requirement, the system comprising:

program code defining a process for receiving data at the client from the server;

program code defining a process for sending an acknowledge packet from the client to the server after a delay period, wherein the acknowledge packet comprises available buffer size information; and program code for defining a process for dynamically modifying the available buffer size information of the acknowledge packet in response to the voice bandwidth requirement for the voice application.

10. An internet telephony device for use with an integrated voice and data network coupled to a server, the device comprising:

a voice application having a voice bandwidth requirement, for providing voice services over the integrated voice and data network;

a non-voice application for providing non-voice services over the integrated voice and data network;

an intercept layer for receiving voice packets and non-voice packets over the integrated voice and data network; and a bandwidth management module coupled to the intercept layer and the voice application, for dynamically managing the transmission of non-voice packets from the server in response to the voice bandwidth requirement for the voice application.

11. The device of claim 10 wherein the bandwidth management module manages the transmission of non-voice packets from the server by delaying sending an acknowledge packet to the server.

12. The device of claim 10 wherein the bandwidth management module manages the transmission of non-voice packets from the server by modifying available buffer space information sent to the server in response to the voice bandwidth requirement for the voice application.

* * * * *